Sept. 26, 1967  R. P. FRITSCH  3,343,213
DEVICE FOR GRANULATING THERMOPLASTIC MATERIAL
Filed March 19, 1965

INVENTOR.
RUDOLF PAUL FRITSCH
BY Hauc and Nydick
ATTORNEYS

United States Patent Office 3,343,213
Patented Sept. 26, 1967

3,343,213
DEVICE FOR GRANULATING THERMOPLASTIC MATERIAL
Rudolf Paul Fritsch, Stuttgart-Weilimdorf, Germany, assignor to Werner & Pfleiderer, Stuttgart, Germany, a firm of Germany
Filed Mar. 19, 1965, Ser. No. 441,055
Claims priority, application Germany, Mar. 24, 1964, W 36,445
6 Claims. (Cl. 18—12)

ABSTRACT OF THE DISCLOSURE

A granulating device for thermoplastic synthetic material in which granules are guided along minimum collision paths and cooled while travelling along said paths.

Figure 1:
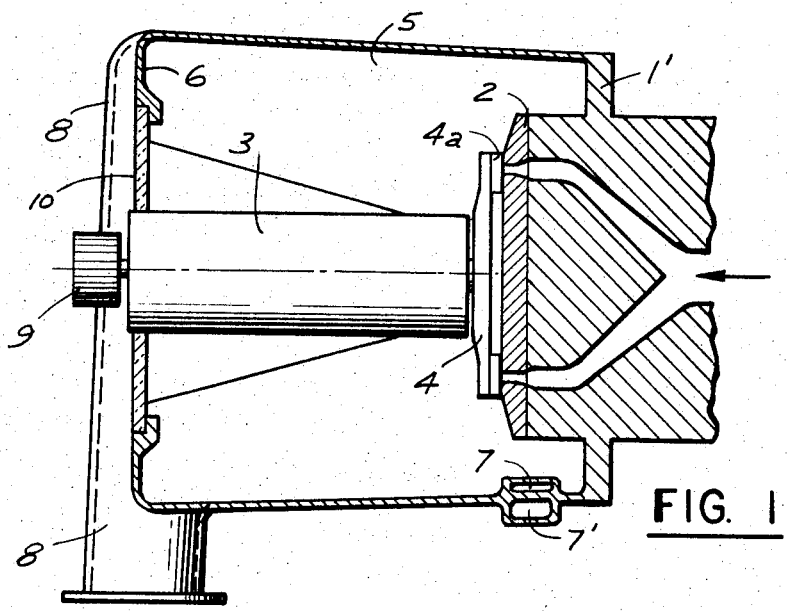

The present invention relates to a device for granulating thermoplastic synthetic material and other thermoplastic materials. Such granulating devices are used in conjunction with worm or screw type extruders.

There are known granulating devices in which the thermoplastic synthetic material, after extrusion through a die head, are granulated by means of a rotary cutting tool which is driven by a shaft disposed parallel to the drive shaft of the extruder laterally spaced therefrom. To obtain the desired sharp cuts, the cutting tool should have a high rotational speed and also abut against the die plate with a rather tight fit. In devices of this type the cutting tool engages the die plate only for a comparatively small section of each revolution. This has the disadvantage that the tool is caused to oscillate or vibrate due to its intermittent engagement with the die head. Such oscillations or vibrations subject the cutting tool to strong strains which cause rapid wear of the tool and also of the die head.

Furthermore, a granulating device to be operative requires a catching and cooling hood to prevent an escape of the granules formed by the cutting of the material extruded from the die head in the form of strands and also to cool the granules, preferably by a coolant such as water. The trajectories of the granules from the die head where they are formed, to the cooling bath in the hood, are comparatively long, the more so as the hood must be rather large, due to the aforedescribed lateral displacement of the drive shaft of the cutting tool with reference to the center axis of the shaft of the extruder. While the granules travel from the die head to the cooling bath in the hood, the trajectories of the granules may cross, which causes a sticking together of colliding granules. It is desirable that all the granules reach the cooling bath in the hood individually, and also that the distance between the die head and the bath be substantially equal for all the granules. It is also desirable that all the granules be substantially uniformly cooled, since each of the granules should retain residual heat sufficient to effect drying of the granules, which are still moist on the outside when they leave the hood, during the further transport of the granules.

The afore-described type of granulating devices also has the disadvantage that the cutting tool, which usually rotates at about 1500 r.p.m., produces a mist or fog of water which may be attracted to the hot die head. As a result, the die head is cooled to a certain extent, which adversely affects the desired temperature conditions at the die head. It has been found that due to such cooling of the die head there is a tendency of the extruded material to form threads, whereby the successively cut-off portions of the extruded material, instead of constituting individual and discrete granules, are discharged somewhat in the form of beads joined by threads. This is highly undesirable and cannot be safely avoided with granulating devices as herein before referred to.

There are also known granulating devices in which the cutting of the extruded material is effected entirely within water. Devices of this kind have die heads including a die plate having annularly disposed apertures and surrounded by a heated jacket. The cutting tool is rotatable about the center axis of the die plate and has several cutting knives or edges which are pressed against the discharge side of the plate by suitable spring means. The catching and cooling hood is filled with a coolant, such as water, which is admitted into the vessel from below and is discharged at the top side of the vessel, carrying with it the cooled granules.

The disadvantage of such a device is that the coolant is in direct heat-conducting contact with the die plate. The resulting cooling of the die plate requires that the same is maintained by a special heating device at a temperature such that the thermoplastic synthetic material will not be rigidified within the apertures of the die plate. It has been found that if the material rigidifies back pressures will be built up in the extruder and such back pressure may become so high that the apertured plate of the die head may be forced out of the same. Another disadvantage of granulating devices in which the cooling of the granules is effected under water is that the feed of the coolant to the water containing vessel constituting the hood of the device must be delayed until the material to be extruded just begins to be discharged from the die head. Otherwise, the coolant may penetrate into the extruder through the apertures of the die plate of the die head.

It is a broad object of the invention to provide a novel and improved granulating device of the general kind above referred to which has all the advantages of the aforedescribed devices but is free of the disadvantages thereof.

To attain the aforementioned object, feature and advantage of the invention and other objects, features and advantages which will be pointed out hereinafter, a rotary cutting tool is mounted coaxially with the center axis of the die head. Such an arrangement permits the use of cutting knives which engage the die head by spring pressure; that is, cutting knives which when rotated are in continuous and intimate contact with the discharge side of the die head.

In granulating devices as heretofore known, the maximum practical number of cutting knives or edges is four or six. The device of the invention permits the use of a considerably higher number of cutting knives or edges which is highly desirable. It also permits a rotary speed of the cutting tool of 2500 r.p.m. and more. With a cutting tool which rotates at such a high speed and which has a high number of cutting edges or knives, all rotating about the center axis of the die head, quantities of thermoplastic material of more than one ton per hour can be conveniently granulated.

A more specific object of the invention is to provide a novel and improved granulating device in which the coolant is not in substantial contact with the die head.

Still another object of the invention is to provide a novel and improved granulating device in which all the granules are formed at the die head with substantially the same cutting speed and in which the trajectories of the individual granules while traveling from the die head to the coolant will not or at least very rarely cross, so that collisions and causing sticking together of granules do not occur, or at least infrequently.

It is another object of the invention to provide a novel and improved granulating device in which the distance which the granules must travel within the hood before reaching the surface of the coolant is as short as practical and substantially the same for all granules.

Still another object of the invention is to provide a novel and improved granulating device in which the dwell time of the granules within the hood and the coolant is substantially uniform for all the granules, and such that the granules when leaving the hood still retain a residual heat sufficient to effect external drying of the granules.

A still further object of the invention is to provide a novel and improved granulating device in which the die plate and the cutting tool can be conveniently observed without obstruction of the view by the coolant while the machine is in operation.

In the accompanying drawing a preferred embodiment of the invention is shown by way of illustration, and not by way of limitation.

Figure 2:
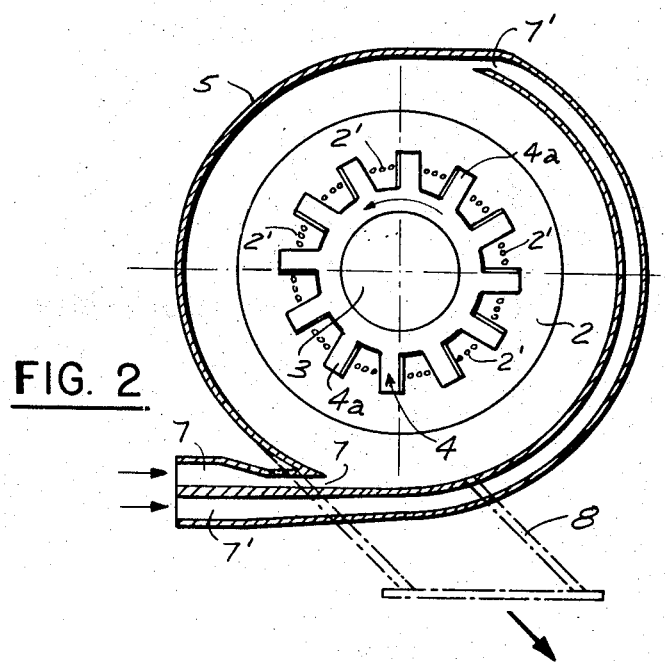

In the drawing:

FIG. 1 is a diagrammatic lengthwise sectional view of a granulating device according to the invention; and FIG. 2 is a cross section through the hood part of the granulating device of FIG. 1.

Referring now to the figures in detail, there is shown a die head 1, which should be visualized as being mounted at the discharge end of a conventional screw or worm type extruder. The die head comprises a die plate 2 including a plurality of annularly disposed discharge apertures 2'. A cutting tool 4 journaled in a bearing 3 is rotary about an axis which is coaxial with the center axis of the die plate 2. The cutting tool comprises a plurality of circumferentially distributed cutting knives or blades 4a. The cutting tool is preferably axially adjustable by means of any suitable and conventional adjustment means so that the cutting edges of knives or blades 4a can be moved into close engagement with the discharge side of die plate 2. As pointed out before, a substantial number of cutting edges, twelve being shown, and a close engagement of the cutting edges with the die plate are desirable for a uniform and smooth cutting action.

The material is extruded through apertures 2' in the form of strands and is cut by the rotating cutting knives 4a. The length of the individual granules thus formed is controlled by the rotational speed of the cutting tool 4 and also by the speed with which the material is extruded through apertures 2'. As is apparent from the drawing and from the foregoing description, all the cutting knives 4a are in continuous contact with the discharge side of die plate 2. As a result, the cutting tool is not subjected to vibrations or oscillations, such as are practically unavoidable when the cutting tool is eccentrically mounted in reference to its drive shaft.

A catching and cooling hood 5 encompasses the die head 1. The hood which preferably has a generally cylindrical cross section, is disposed coaxially with the die head and extends forwardly in reference to the die plate 2. As is clearly shown in FIG. 1, the hood is preferably outwardly tapered in the forward direction. The bearing 3 for tool 4 is supported by the forward end wall 6 of the hood. The drive shaft of tool 4 may support a gear 9, which should be visualized as being coupled to a suitable drive means. A window 10 in the front wall 6 surround bearing 3 to permit a convenient observation of the cutting tool and the die plate when and while the granulating device is in operation. The hood is closed off at its end adjacent to the die head by a peripheral flange 1' extending from the die head.

As is readily apparent from an examination of the drawing, all the granules, irrespective of the location of the apertures 2' at which they are cut off from the strands of material, will travel substantially the same distance before reaching the inner peripheral wall of hood 5.

A suitable coolant, such as water, is fed into the hood by means of tangential inlet duct means. Two inlet ducts 7 and 7' are shown which feed the coolant into the hood at preferably diametrically spaced points. The coolant is discharged from the hood through a duct 8 connected to the forward end wall 6 of the hood.

As is evident, the coolant fed into the hood will spiral along substantially the inner peripheral wall of the hood until leaving the hood through duct 8. Instead of obtaining the desired spiral movement of the coolant within the hood by outwardly tapering the latter, a similar effect can be obtained by suitably slanting the inlet ducts 7 and 7' in reference to the transverse plane of the hood. While two inlet ducts are shown, one inlet duct or more than two inlet ducts may be provided.

Ducts 7 and 7' preferably issue posteriorly of the discharge side of die plate 2 as seen in the direction of movement of the material through the die plate.

The granules, when outwardly propelled by the rotary action of the cutting tool, enter the flow of coolant spiraling along the walls of the hood. As a result, they are immediately extensively cooled and are carried along in the flow of the coolant until they are discharged together with the coolant through duct 8.

As is evident, all the granules will travel through about the same distance within the coolant, so that they are subjected to substantially the same cooling action.

Futhermore, the trajectories of the granules, irrespective of the point of origin of the granules at the die plate 2, are so oriented that there will be few if any collisions of granules before they enter the flow of the coolant, thus effectively avoiding the sticking together of granules. The total distances which the granules have to travel, first substantially in air from the point or origin at apertures 2' to the surface of the coolant, and then within the coolant before being discharged through duct 8, can be conveniently adjusted to the specific requirements by varying the rate of speed of the coolant within the hood by changing the pressure at which the coolant is fed into the hood.

The spiraling movement of the coolant substantially along the peripheral walls of the hood permits convenient and clear observation of the entire operation through window 10.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A device for granulating thermoplastic synthetic material, said device comprising a die head including substantially annularly disposed discharges apertures for discharging the material to be granulated in the form of strands, a rotary cutting tool including a plurality of substantially radially disposed and circumferentially spaced cutters for granulating the discharged material, said cutting tool being mounted on the discharge side of said die head closely adjacent thereto and coaxially with the center axis of said annularly disposed apertures, a closed catching and cooling hood of substantially circular cross section disposed coaxially with said cutting tool for catching the granules formed by cutting of the discharged material, said hood housing the cutting tool and extending forwardly in reference to said die head and cutting tool, inlet conduit means connected to the hood adjacent to said die head for tangentially directing a pressurized flow of a coolant into said hood to generate therein a spiraling flow of the coolant directed toward the forward end of the hood and carrying with it the granules while cooling the same, and outlet conduit means connected to said hood forwardly spaced apart from said inlet conduit means for discharging the coolant and the cooled granules therein from the hood.

2. A device according to claim 1, wherein said die head includes a die plate having said annularly disposed apertures, and wherein the cutters of said rotary cutting tool have cutting edges facing the discharge side of said die plate and rotating in a plane parallel to the general plane of the discharge side of said plate in engagement with said side.

3. A device according to claim 1, wherein said inlet conduit means are tangentially oriented in reference to the peripheral wall of the hood to direct the flow of the pressurized coolant substantially upon the inner peripheral wall of said hood.

4. A device according to claim 1, wherein said inlet conduit means communicates with the hood in substantially the general plane of the discharge side of said die head, and wherein said inlet conduit means communicate with the hood at the end thereof remote from said die head.

5. A device for granulating thermoplastic synthetic material, said device comprising a die head including substantially annularly disposed discharge apertures for discharging the material to be granulated in the form of strands, a rotary cutting tool including a plurality of substantially radially disposed cutters for granulating the discharged materials, said cutting tool being mounted on the discharge side of said die head coaxially with the center axis of said annularly disposed apertures, a closed catching and cooling hood of substantially circular cross section disposed coaxially with the rotary axis of the cutting tool and housing the latter for catching the granules formed by cutting said material, said die head constituting part of one end wall of the hood and being concentric with the axis thereof, inlet conduit means communicating with the hood near said die head for feeding a flow of pressurized coolant into the same, said conduit means being tangentially disposed with reference to the peripheral wall of the hood for directing said flow of coolant toward the peripheral wall of the hood to generate a spiraling flow of the coolant directed toward the other end wall of the hood and carrying with it the granules and cooling the same, and an outlet conduit means communicating with the hood at said other end thereof for discharging the coolant and the granules contained therein from the hood.

6. A device according to claim 5, wherein said inlet conduit means comprise several tangentially oriented inlet ducts communicating with the hood at circumferentially spaced points thereof.

References Cited

UNITED STATES PATENTS

| 2,524,751 | 10/1950 | Berger | 18—12 |
| 2,642,819 | 6/1953 | Birdsall | 18—12 X |
| 2,669,195 | 2/1954 | Pellegrino | 18—12 X |
| 3,271,821 | 9/1966 | Street | 18—12 |

FOREIGN PATENTS

| 1,377,421 | 9/1964 | France. |

WILLIAM J. STEPHENSON, *Primary Examiner.*